United States Patent
Brosche (10) Patent No.: US 11,249,180 B2
(45) Date of Patent: Feb. 15, 2022

(54) METHOD AND DEVICE FOR ASCERTAINING TRANSVERSE RELATIVE VELOCITY COMPONENTS OF RADAR TARGETS

(71) Applicant: Robert Bosch GmbH, Stuttgart (DE)

(72) Inventor: Thomas Brosche, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 16/493,513

(22) PCT Filed: Jan. 25, 2018

(86) PCT No.: PCT/EP2018/051796
§ 371 (c)(1),
(2) Date: Sep. 12, 2019

(87) PCT Pub. No.: WO2018/166683
PCT Pub. Date: Sep. 20, 2018

(65) Prior Publication Data
US 2021/0132212 A1   May 6, 2021

(30) Foreign Application Priority Data
Mar. 17, 2017   (DE) .......................... 102017204495.0

(51) Int. Cl.
*G01S 13/72* (2006.01)
*G01S 7/295* (2006.01)
(Continued)

(52) U.S. Cl.
CPC ............ *G01S 13/723* (2013.01); *G01S 7/295* (2013.01); *G01S 13/42* (2013.01); *G01S 13/58* (2013.01)

(58) Field of Classification Search
None
See application file for complete search history.

(56) References Cited

U.S. PATENT DOCUMENTS

| | | | |
|---|---|---|---|
| 2003/0163280 A1* | 8/2003 | Steinlechner | G08G 1/161 702/141 |
| 2015/0331096 A1* | 11/2015 | Schoor | G01S 13/584 342/112 |
| 2016/0245911 A1 | 8/2016 | Wang et al. | |

FOREIGN PATENT DOCUMENTS

| | | |
|---|---|---|
| DE | 102012220879 A1 | 5/2014 |
| WO | 2015197222 A1 | 12/2015 |
| WO | 2015197229 A1 | 12/2015 |

OTHER PUBLICATIONS

International Search Report for PCT/EP2018/051796, dated Apr. 30, 2018.
(Continued)

*Primary Examiner* — Whitney Moore
(74) *Attorney, Agent, or Firm* — Norton Rose Fulbright US LLP; Gerard Messina (57) ABSTRACT

A method for ascertaining a transverse-velocity-component (TVC) of a radar-target (RT), including: periodically sending modulated, transmitted signals with a transmitting device (TD) having transmission-elements, into a sensing-region of the radar-device (RD), during a measuring-period; receiving a radar-signal (RS) reflected by the RT, using a receiving-device having receiving-elements; transmitting the received (RS) to an evaluation-device and converting it; performing a two-dimensional Fourier-transformation (FT) to generate a velocity-distance spectrum (VDS) of the digital-measured values for each transmission/receiving element; detecting a target reflection of the RT in light of, peak values in a magnitude-spectrum of the VDS; ascertaining a distance of the RT from the RD, and a radial-velocity-component relative to the RD, from the VDS; determining an angle of the RT relative to the antenna; selecting the RT; performing an inverse FT of the target reflection of the RT, and ascertaining the transverse-velocity-component of the RT from the transformed-measured values.

12 Claims, 4 Drawing Sheets

(51) Int. Cl.
*G01S 13/42* (2006.01)
*G01S 13/58* (2006.01)

(56) References Cited

OTHER PUBLICATIONS

D. Kellner et al., "Instantaneous Lateral Velocity Estimation of a Vehicle using Doppler Radar", 16th International Conference on Information Fusion, Istanbul, Turkey, 2013, pp. 1-8.
Bai, et al.: "Performance Analysis of Lateral Velocity Estimation Based on Fractional Fourier Transform", IEICE Trans. Commun., E95-B No. 6 (2012), pp. 2174-2178.
Foelster and Rohling: "Lateral velocity estimation based on automotive radar sensors", Radar 2006: Proceedings of 2006 CIE International Conference on Radar, China (2006), pp. 1-6. XP031073571.
Haderer, et al.: "Lateral Velocity Estimation Using an FMCW Radar", Proceedings of 6th European Radar Conference, Rome, Italy (2009), pp. 129-132.
Lutz, et al.: "On fast chip Modulations and Complressed Sensing for Automotive Radar Applications", International Radar Symposium (2014), pp. 1-6.
Skolnik, Merrill: Chapter 1: "An Introduction and Overview of Radar", in Radar Handbook, 3rd Editions (2008), The McGraw-Hill Co.

\* cited by examiner

METHOD AND DEVICE FOR ASCERTAINING TRANSVERSE RELATIVE VELOCITY COMPONENTS OF RADAR TARGETS

FIELD OF THE INVENTION

The present invention relates to a method for ascertaining transverse relative velocity components of radar targets. The present invention further relates to a device for ascertaining transverse relative velocity components of radar targets.

BACKGROUND INFORMATION

Figure 1:
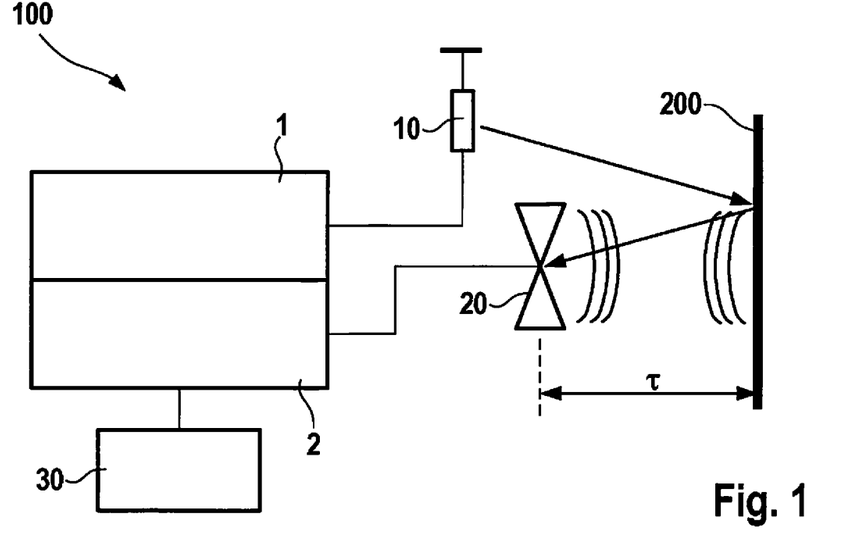
FIG. 1 shows a basic block diagram of a radar system.

Radar systems, such as from M. Skolnik, "Radar Handbook," 3rd edition, 2008, are known in the related art. FIG. 1 shows a basic representation of a known radar device 100. A modulated radar signal generated in a transmitter 1 is emitted via a transmitting antenna 10. The emitted electromagnetic signal is then reflected by radar targets 200 possibly present in a detection field (e.g., motor vehicles, persons, poles, guardrails, transitions between different materials, etc.) and received again via a receiving antenna 20, after a delay time τ, and subsequently processed in receiver 2 with the aid of an evaluation device 30.

Figure 2:
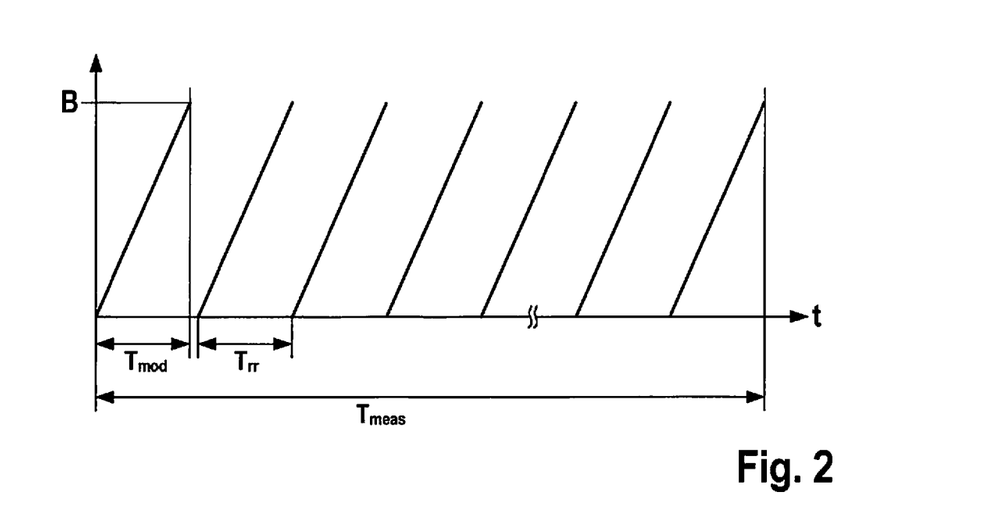
FIG. 2 shows time characteristics of the modulation frequency of examples of ramp signals used for the method.

New types of radar systems use so-called fast-chirp or rapid-chirp modulation as transmitted signals, as is known, e.g., from Steffen Lutz, Daniel Ellenrieder, Thomas Walter, Robert Weigel: "On fast chirp Modulations and Compressed Sensing for Automotive Radar Applications," International Radar Symposium, 2014. In this connection, during a, e.g., 20 ms long measuring interval $T_{meas}=M \times T_{rr}$, a total of M short FMCW (frequency-modulated, continuous-wave) ramps having a period $T_{mod}$ of, e.g., 10 μs to 100 μs are transmitted, as shown in FIG. 2. In this context, the time interval of the individual ramps $T_{rr}$ is in the same order of magnitude; this also being able to be somewhat more or less than the ramp period. The ramps may also not be positioned temporally equidistantly (not shown).

Radar systems having interleaved ramps, which are used, for example, for resolving ambiguities in the speed or distance, are known, e.g., from DE 10 2012 220 879 A1, WO 2015 197 229 A1 or WO 2015 197 222 A1.

As a result, the received signal is initially obtained over the (modulation) frequency for each individual ramp. The measured and, as a rule, digitized, received signal corresponding to the specific ramp may now be transformed to the time domain by an inverse Fourier transform. To this end, however, a digital Fourier transform (DFT) or fast Fourier transform (FFT) is mostly used with suitable windowing, and the range transformed in this manner is referred to as a "beat frequency range." One step additionally provided is the Fourier transformation to the Doppler frequency range from ramp to ramp. To this end, the Fourier transformation is carried out along corresponding values of the individual ramps (in the Doppler direction or direction of the velocity). The order of the two transformations may also be reversed, or they may be regarded as a two-dimensional Fourier transformation.

What typically follow, are further steps, such as the detection, the estimation of the distance and of the radial component of the relative velocity in light of the positions of the peaks in the two-dimensional spectrum; as well as different instances of error compensation. In this context, a peak corresponds to a target reflection; a physical target (e.g., motor vehicle, person, pole, etc.) being able to have a plurality of target reflections.

If the radar system includes an antenna having a plurality of transmission and/or receive channels (e.g., implemented by individual patches of a patch antenna), that is, an antenna array, then an estimation of the angle of the target reflections and, therefore, a determination of the 3-D target positions in space, may additionally be carried out. To that end, prior to the detection, the first signal processing steps are executed separately for each combination of transmission and receive channel. The estimation of the angle is then carried out in light of the combined spectra of the individual channels. The estimated target (reflection) parameters may be used, for example, for subsequent tracking, clustering, target classification, and/or data fusion for many different applications, such as adaptive cruise control (ACC), blind spot detection, automatic emergency braking function, etc.

A method for estimating transverse velocities of radar targets is known from D. Kellner et al., "Instantaneous Lateral Velocity Estimation of a Vehicle using Doppler Radar," 16th International Conference on Information Fusion, Istanbul, Turkey, 2013. In this context, the transverse velocities are determined by combining a plurality of target reflections, which are associated with a single, fixed body. This is possible, since the distribution of the measured radial components of the relative velocities are a function of the individual positions of the reflections in space. A condition for this is that for the corresponding physical target, a plurality of spatially distributed reflection positions may also be measured and clustered as belonging to one another. However, incorrect associations may also be formed during the clustering.

Known approaches in radar signal processing only determine the radial, i.e., longitudinal components of the relative velocity between the radar sensor and individual reflection positions of targets.

SUMMARY

An object of the present invention is to provide an improved method for ascertaining a transverse velocity of a radar target.

According to a first aspect, the object is achieved by a method for ascertaining a transverse velocity component of at least one radar target with the aid of a radar device, including the steps:

periodically sending identically modulated, transmitted signals with the aid of a transmitting device having a defined number of transmission elements, into a defined sensing region of the radar device during a defined measuring period;
  receiving at least one received radar signal reflected by the radar target, using a receiving device having a defined number of receiving elements;
  transmitting the received radar signal to an evaluation device and converting the received radar signal from analog to digital;
  carrying out a two-dimensional Fourier transformation to generate, in each instance, a velocity-distance spectrum of the digital, measured values for each combination of transmission and receiving element;
  detecting at least one target reflection of the radar target in light of defined, peak values in a magnitude spectrum of the velocity-distance spectrum;
  ascertaining a distance of the radar target from the radar device, as well as a radial velocity component relative to the radar device, from the velocity-distance spectrum;

determining at least one angle of the radar target relative to the antenna;

selecting the radar target, for which the transverse velocity component should be ascertained;

carrying out an inverse Fourier transformation of the target reflection of the radar target selected in this manner; and ascertaining the transverse velocity component of the radar target from the transformed measured values.

In this manner, it is advantageously possible to measure a transverse velocity component of a radar target, using a single measurement. Due to this, expensive tracking methods are advantageously not necessary, which means that a complete velocity vector is acquired, using a single measurement.

According to a second aspect, the object is achieved by a device for ascertaining a transverse velocity component of at least one radar target with the aid of a radar device, including:

a transmitting device, which has a defined number of transmission elements and is configured to periodically send identically modulated, transmitted radar signals into a defined sensing region of the radar device during a defined measuring period;

a receiving device, which has a defined number of receiving elements and is configured to receive at least one received radar signal reflected by the radar target, and;

a processing device, which is configured to:

convert the received radar signals from analog to digital;

perform a two-dimensional Fourier transformation for generating a velocity-distance spectrum of the digital, measured values;

detect at least one target reflection of the radar target in light of defined, peak values in a magnitude spectrum of the velocity-distance spectrum;

ascertain a distance of the radar target from the antenna, as well as a radial velocity component relative to the antenna, from the velocity-distance spectrum;

determine at least one angle of the radar target relative to the antenna;

all of the target reflections and interference being suppressed, with the exception of the radar target, for which the transverse velocity component is intended to be estimated; and an inverse Fourier transformation being carried out for the target reflection of the radar target selected in this manner; the transverse velocity component of the radar target being ascertained from the transformed, measured values.

Advantageous further refinements of the method provide that the identically modulated, transmitted signals be ramp-shaped, frequency-modulated radar signals or non-linear ramp signals or periodic pulse signals or OFDM signals. In this manner, different radar signals may advantageously be used for implementing the method.

Another advantageous further refinement of the method provides for the transverse velocity component of the at least one radar target to be ascertained in the azimuthal direction and/or in the direction of elevation. This advantageously supports a comprehensive detection characteristic of the radar device.

Another advantageous further refinement of the method provides for the following mathematical model to be used for modeling physical conditions:

$$r(t) = \sqrt{r_0^2 + (v_q \cdot t)^2} ;$$

$$\Delta r(t) = r(t) - r_0;$$

$$t = -\frac{T_{meas}}{2} \ldots \frac{T_{meas}}{2}$$

$$v_e = -\frac{v_q^2 \cdot t}{r(t)};$$

$$a_e = -\frac{(r_0 \cdot v_q)^2}{r(t)^3};$$

$$\Delta\varphi(t) = 2a\tan\left(\frac{v_q t}{2r_0}\right)$$

$$\Delta \bar{r} = \begin{cases} r_0 \cdot \left(\frac{\sqrt{1+b^2}}{2} + \frac{1}{2b} \cdot \ln\left(b + \sqrt{1+b^2}\right) - 1\right); & v_q \neq 0 \text{ m/s} \\ 0 & v_q \neq 0 \text{ m/s} \end{cases}$$

$$\bar{v}_e = 0 \text{ m/s};$$

$$\bar{a}_e = \frac{-2v_q^2}{\sqrt{(2r_0)^2 + (v_q T_{meas})^2}};$$

$$b = \frac{v_q T_{meas}}{2r_0}$$

including the parameters:

$\Delta \bar{r}$ . . . average value of the change in distance over the entire measuring time $v_q$ . . . transverse velocity (transverse velocity component)

$r(t)$ . . . distance over the measuring period (from ramp to ramp)

$\Delta\varphi(t)$ . . . change in the azimuthal or elevation angle over time $v_e$ . . . radial velocity component resulting from the transverse velocity $a_e$ . . . radial acceleration component resulting from the transverse velocity $r_0$ . . . minimum target distance at time t=0 s In this manner, the transverse velocity component may be ascertained on the basis of a simple mathematical model.

Another advantageous further refinement of the method provides that an estimation of the transverse velocity component be ascertained by maximizing a quality function, using the following mathematical equations:

$$\{\hat{v}_{q,a}, \hat{v}_{q,e}\} = \underset{v_{q,a}, v_{q,e}}{\mathrm{argmax}} |Q(v_{q,a}, v_{q,e})|;$$

$$m = 0, \ldots, M-1;$$

$$T_{meas} = M \cdot T_{RR}$$

$$Q(v_{q,a}, v_{q,e}) = \sum_{m=0}^{M-1} |(x_m^T \cdot A_c) \cdot a_m(v_{q,a}, v_{q,e}) \cdot \exp(-j \cdot \omega_d \cdot T_{RR} \cdot m)|^2$$

$$a_m(v_{q,a}, v_{q,e}) = \exp[-j \cdot \Delta\beta_m(v_{q,a}, v_{q,e})];$$

$$\Delta\beta_m(v_{q,a}, v_{q,e}) = 2[r_m(v_{q,a}, v_{q,e}) - \bar{r}] \cdot k$$

including the parameters:

Q . . . quality function of the transverse velocity components in azimuth and elevation $v_{qa}$ . . . transverse velocity component in azimuth $v_{qe}$ . . . transverse velocity component in elevation k . . . wave number $a_m$ . . . vector having entries corresponding to a number of virtual receive channels (combination of transmission and receive channel)

$A_c$ ... calibration matrix
m ... index of time
$r_m$ ... vector of the target distances from all receive channels at time $t_m$
$\omega_d$ ... estimated angular Doppler frequency
$\bar{r}$ ... average target distance in the measuring interval
$T_{RR}$ ... period of time between the ramp signals
$\Delta\beta_m$ ... change in the phase angle of the measuring signal at time $t_m$
$x_m^T$ ... transposed vector including the preprocessed, selected and inverse-Fourier-transformed, measuring signal at time $t_m$, which contains, as much as possible, only the signal portion of the reflection (peak) of a physical target, for which the transverse velocity is currently intended to be estimated.

In this manner, a correlation is provided, which is simple to perform, and by which a distance and the sought-after relative velocity components of a radar target 200 are converted to a phase angle of the measuring signal.

An advantageous further refinement of the method provides that a selection and reconstruction of a target reflection signal be carried out over an angular spectrum; target reflection positions over the azimuth and/or elevation angles being separated from each other. In this manner, in the case in which a plurality of target reflections in the distance-velocity space are situated at the same distance/velocity position, radar targets may be distinguished.

Another advantageous further refinement of the method provides that for the determination of the radar targets, the sensing region having the transverse velocities be selected in such a manner, that the quality function is convex in the sensing region and, in addition, the sensing region is not completely scanned. In this manner, the complete sensing region does not have to be processed, so that one does not "get stuck" in a local maximum. This supports the efficient execution of the method, e.g., it may be carried out with the aid of known gradient methods, such as Newtonian iteration.

Another advantageous further refinement of the method provides for the method to be implemented application-specifically for selected radar targets. In this manner, the method may advantageously be used for various applications of a radar system in a motor vehicle, such as for an ACC system, automatic emergency braking function, blind spot detection, etc.

According to another advantageous further refinement of the method, the method is used for a tracking-based method. In this manner, the known, tracking-based methods may be executed more precisely, which means that a prediction of radar targets is improved.

Method features described follow analogously from corresponding device features described, and vice versa. In particular, this means that features, technical advantages and explanations regarding the method follow in an analogous manner from corresponding features, technical advantages and explanations regarding the device, and vice versa.

DETAILED DESCRIPTION

One object of the present invention is, in particular, to ascertain transverse components of a velocity of radar targets, that is, their complete velocity vectors, from a single measurement, without previous clustering or tracking.

The radar device 100 of FIG. 1, which is known per se, is used for this; identically modulated, transmitted signals being emitted by a transmitting device 1, 10 into a detection region, in a measuring interval or measuring period $T_{meas}$. In this context, the identically modulated, transmitted signals may be ramp-shaped, frequency-modulated radar signals or non-linear ramp signals or periodic pulse signals or OFDM signals.

The transverse velocity components are determined within measuring period $T_{meas}$ with the aid of the measured values and are available, for example, for subsequent tracking, clustering, target classification, etc., as additional data. In this manner, the possibly incorrect assignment of the reflection positions, from measurement to measurement, in the tracking and derivatives with respect to time of the reflection positions, is advantageously prevented.

According to the present invention, the additionally acquired information about the transverse velocity component may be used for improved functionality of a driver assistance system of a motor vehicle, e.g., of an automatic emergency braking function. In this context, it may advantageously be discerned if, for example, the target is moving out of or into one's own traffic lane. The ascertained, transverse velocity component for the target to be tracked may also be used for blind spot detection and/or ACC.

Using the method provided, it is also optionally possible to implement a warning and/or a collision avoidance function for falling objects (e.g., rockfall in the mountains, stones falling from bridges, etc.). In this case, the estimated transverse velocity may additionally be used for tracking; a suitable antenna design having a sufficiently large detection field being necessary, particularly in the direction of elevation.

Figure 3:
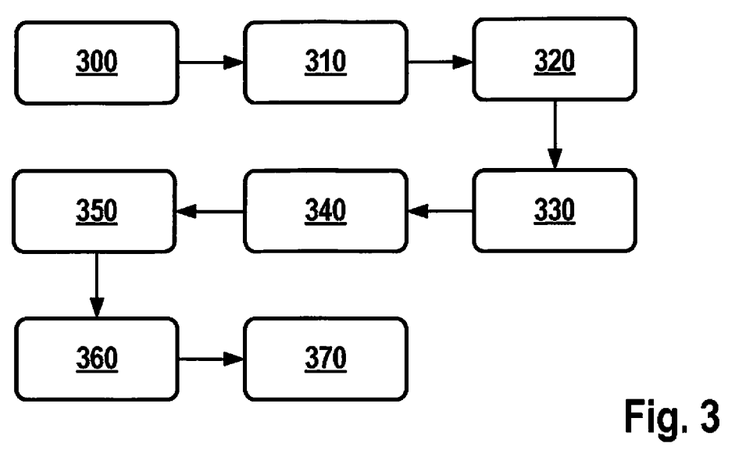
FIG. 3 shows a basic flow chart of signal processing for ascertaining a transverse velocity component of a radar target.
Figure 4:
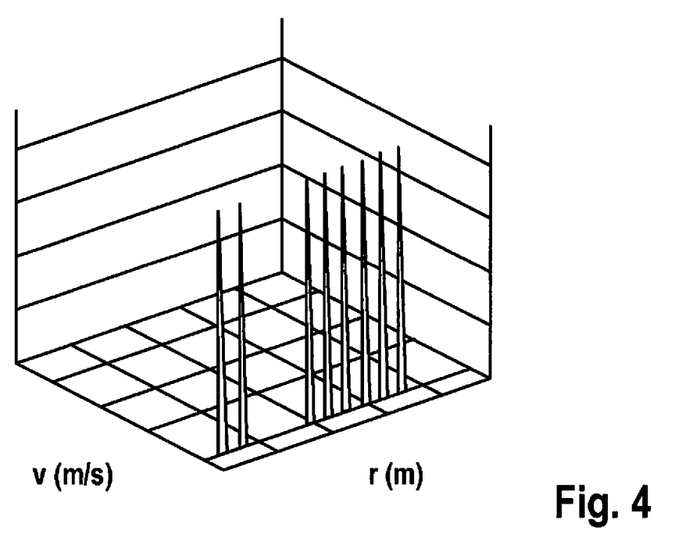
FIG. 4 shows a plurality of radar targets of a magnitude spectrum in a distance-velocity space.

A basic flow chart of signal processing necessary for the proposed method is represented in FIG. 3. Using the measured values converted from analog to digital in step 300, a two dimensional spectrum in the beat frequency Doppler and/or, after compensating for the Doppler portion, in the beat frequency (not shown), in the distance-velocity space, as is basically shown as a magnitude spectrum in FIG. 4, is obtained after a two-dimensional Fourier transformation (2D-DFT) carried out in step 310 for each channel, that is, for each combination of transmission and receiving elements of antenna (e.g., patch array) 10, 20. In a purely illustrative manner, FIG. 4 shows a total of eight target reflections, which, in the distance-velocity space, are all located at different distances, with the same radial velocity.

In step 320, detected peak values (peaks) for the target reflections are obtained in a magnitude spectrum computed from the individual spectra of the channels; the positions of the peak values being estimated in step 330. In step 340, an angular approximation in the azimuthal and/or elevation direction for the target reflections in question is subsequently carried out with the aid of the measured values of a plurality of channels (e.g., of a MIMO antenna system) belonging to the specific, detected reflection positions.

Consequently, steps 300 through 340 include standard steps of signal processing known per se.

Now, according to the present invention, the transverse velocity component is also estimated or calculated approximately for one or more selected, detected target reflections. For this purpose, in the individual spectra, the values not belonging to the specific target reflection or peak are set to zero ("windowing," as explained in more detail in FIG. 9) in step 350, through which, as a result, a selection of the measured values representing the target reflections is made. Alternatively, an accurate estimate of the complex-valued peak amplitude and position may also be made for this purpose. In step 360, this reconstruction is then inverse-Fourier-transformed in the Doppler direction, so that a sequence of preprocessed, complex signal values $x_m$ is obtained, which corresponds to the specific, temporally consecutive ramps.

In step 370, the transverse velocity components in the azimuthal and/or elevation direction are estimated, using the measured values $x_m$ obtained and preprocessed in this manner. To that end, the distance varying over measuring period $T_{meas} = M \times T_{rr}$ (that is, from ramp m to ramp m+1) is reflected by the following simple, mathematical model:

$$r(t) = \sqrt{r_0^2 + (v_q \cdot t)^2};$$

$$\Delta r(t) = r(t) - r_0;$$

$$t = -\frac{T_{meas}}{2} \ldots \frac{T_{meas}}{2}$$

$$v_e = -\frac{v_q^2 \cdot t}{r(t)};$$

$$a_e = -\frac{(r_0 \cdot v_q)^2}{r(t)^3};$$

$$\Delta \varphi(t) = 2 \operatorname{atan}\left(\frac{v_q t}{2 r_0}\right)$$

In this context, the average distance change, radial velocity and acceleration are determined as follows:

$$\Delta \bar{r} = \begin{cases} r_0 \cdot \left( \frac{\sqrt{1+b^2}}{2} + \frac{1}{2b} \cdot \ln\left(b + \sqrt{1+b^2}\right) - 1 \right); & v_q \neq 0 \text{ m/s} \\ 0 & v_q = 0 \text{ m/s} \end{cases}$$

$$\bar{v}_e = 0 \text{ m/s};$$

$$\bar{a}_e = \frac{-2 v_q^2}{\sqrt{(2r_0)^2 + (v_q T_{meas})^2}};$$

$$b = \frac{v_q T_{meas}}{2 r_0}$$

including the parameters:
b . . . auxiliary parameter, for improving the clarity
$r_0$ . . . minimum distance of the radar target in the middle of the measuring interval (at time t=0)
$\Delta r(t)$ . . . temporal change in distance of the radar target
$v_q$ . . . transverse velocity in either the azimuthal direction or the direction of elevation
$v_e$ . . . angle-dependent, radial component of the relative velocity, resulting from the transverse velocity
$a_e$ . . . angle-dependent, radial acceleration component resulting from the transverse velocity
$\Delta \varphi$ . . . change in angle in either the azimuthal direction or the direction of elevation, or a linear combination of the two.

Thus, the transverse velocity acts upon the measuring signal via both a temporal change in distance and a change in angle, as is represented below in FIGS. 5, 6 and 7.

Figure 5:
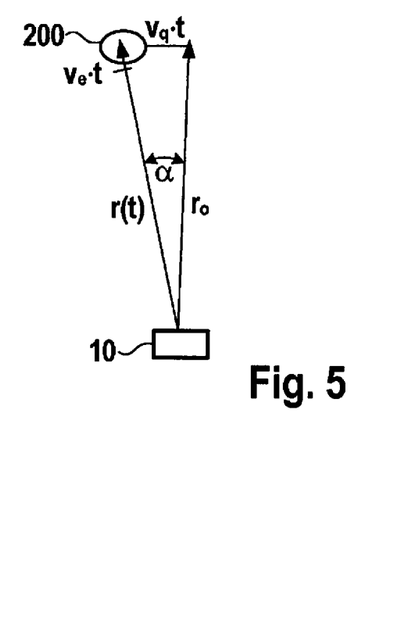
FIG. 5 shows a representation of a physical relationship of the transverse velocity of a radar target.

FIG. 5 shows an antenna 10, 20 and distance $r_0$ of radar target 200 at time t=0, and a distance traveled $v_q \times t$ after time t due to transverse velocity component $v_q$, as well as a stretch of path $v_e \times t$ resulting from it due to radial velocity component ve.

Figure 6:
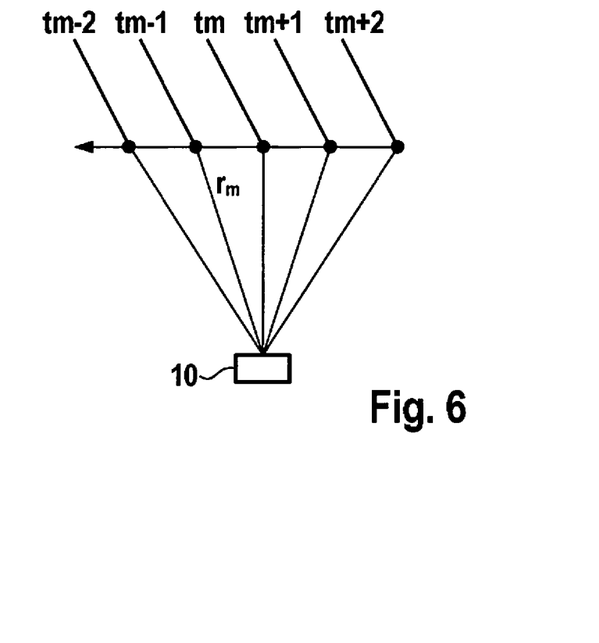
FIG. 6 shows a representation of changing vectors for radar targets.

FIG. 6 shows antenna 10, 20 and intermediate times $t_m$ of the ramp signals, along with distances $r_m$ of radar target 200 from antenna 10, 20 resulting from this.

Figure 7:
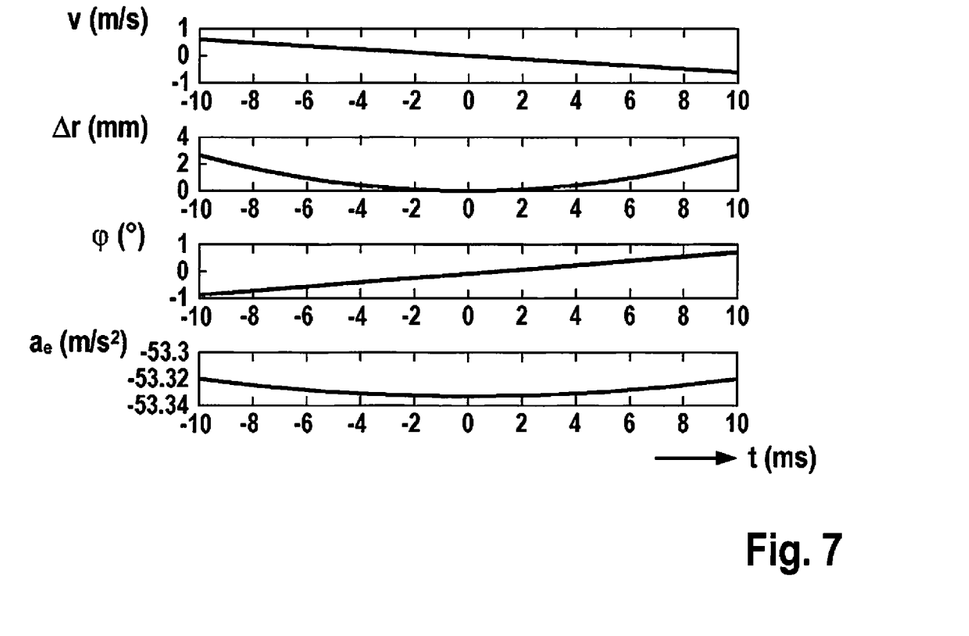
FIG. 7 shows a plurality of time characteristics of changing parameters of radar targets.

In four graphs, from the top to the bottom, FIG. 7 shows, purely illustratively, a time characteristic of radial velocity component $v_e$ due to transverse velocity component $v_q$, a change in distance $\Delta r$ resulting from it, a change in angle $\Delta \varphi$ resulting from it, and a change in acceleration $a_e$ of radar target 200 resulting from it.

For the estimation of transverse velocity component $v_q$, the target positions at the times of specific ramp m are now calculated as a function of $v_q$, and the resulting phase changes $\Delta \beta_m$ in the individual receive channels are ascertained; in the case of MIMO systems, the virtual receive channels resulting from the combination of actual transmission and receive channels being meant, here.

For each time step m, a vector $a_m(v_{q,a}; v_{q,e})$, whose elements represent the receive channels, is obtained. The entirety of all M vectors produces a matrix, whose columns represent the receive channels, and whose rows represent the ramp times. In each instance, this is calculated for the combination, to be checked, of transverse velocities in the azimuthal direction $v_{q,a}$ and in the direction of elevation $v_{q,e}$, and multiplied by preprocessed measured value vector $x_m$. The transverse velocities are then estimated by maximizing the quality function $Q(v_{q,a}; v_{q,e})$ over $v_{q,a}$ and/or $v_{q,e}$ in accordance with the following mathematical model:

$$\{\hat{v}_{q,a}, \hat{v}_{q,e}\} = \underset{v_{q,a}, v_{q,e}}{\operatorname{argmax}} |Q(v_{q,a}, v_{q,e})|;$$

$$m = 0, \ldots, M - 1;$$

$$T_{meas} = M \cdot T_{RR}$$

$$Q(v_{q,a}, v_{q,e}) = \sum_{m=0}^{M-1} |(x_m^T \cdot A_c) \cdot a_m(v_{q,a}, v_{q,e}) \cdot \exp(-j \cdot \omega_d \cdot T_{RR} \cdot m)|^2$$

$$a_m(v_{q,a}, v_{q,e}) = \exp[-j \cdot \Delta \beta_m(v_{q,a}, v_{q,e})];$$

$$\Delta \beta_m(v_{q,a}, v_{q,e}) = 2[r_m(v_{q,a}, v_{q,e}) - r] \cdot k$$

including the parameters:
Q . . . quality function of the transverse velocity component in azimuth and elevation
$v_{qa}$ . . . transverse velocity component in azimuth
$v_{qe}$ . . . transverse velocity component in elevation
k . . . wave number
$a_m$ . . . vector having entries corresponding to a number of virtual receive channels (combination of transmitting and receive channels)

$A_c$ ... calibration matrix
m ... ramp index or index of the time from ramp to ramp
$r_m$ ... vector of the target distances from all receive channels at time $t_m$
$\omega_d$ ... estimated angular Doppler frequency
$\bar{r}$ ... average target distance in the measuring interval
$T_{RR}$ ... period of time between the ramp signals
$\Delta\varphi_m$ ... change in the azimuthal angle and/or angle of elevation at time $t_m$
$x_m^T$ ... transposed vector including the preprocessed, selected, and inverse Fourier-transformed measuring signal at time $t_m$, which contains, as much as possible, only the signal portion of the reflection (peak) of a physical target, for which the transverse velocity is currently intended to be estimated.

Figure 8:
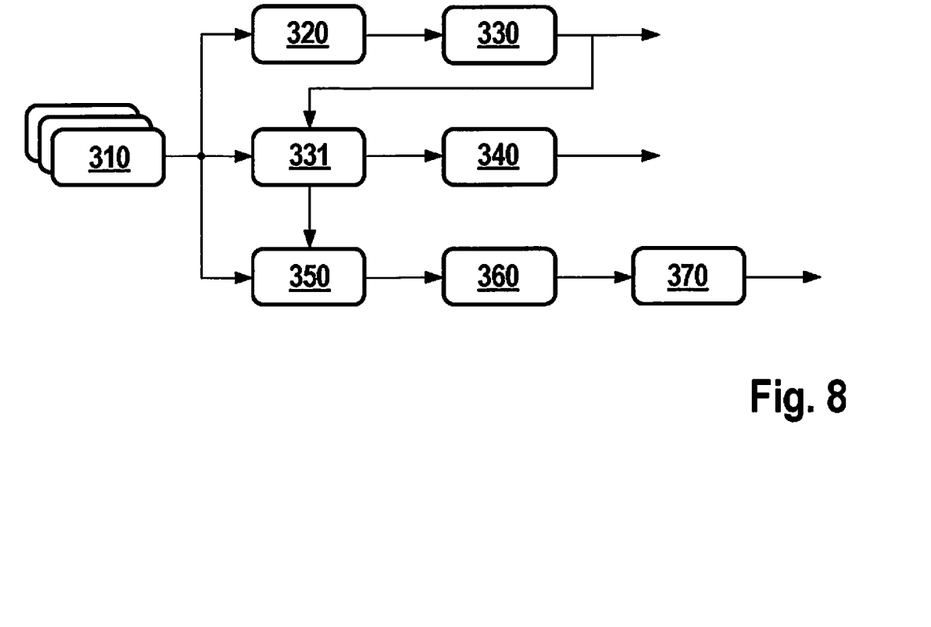
FIG. 8 shows a basic flow chart of further signal processing for ascertaining a transverse velocity component of a radar target.

FIG. 8 shows a basic flow chart of the method, which substantially corresponds to the flow chart of FIG. 3, with the difference that in FIG. 8, it is indicated, in step 310, that the two-dimensional Fourier transformation is carried out for a plurality of channels (that is, virtual receive channels). In one step 331, a selection of the measured values for an angle approximation is also represented. This optional, additional step is useful, in particular, in order to reduce the expenditure for estimation of the angle 340, that is, to carry out the angle estimation only for peak positions in the distance-velocity spectra, which are assigned to relevant targets for the subsequent applications.

If the positions of the virtual receiving antennae are substantially equidistant from each other, through which the minor lobes may be suppressed, for example, via FFT windowing (e.g., Kaiser window, Dolph-Chebyshev window), and in this manner, a high dynamic response in the angular spectrum is supported, it is then more easily possible to select the radar target for the estimation of the transverse velocity 350, in the angular spectrum, as well.

If this does not occur, then the estimation of transverse velocity component $v_q$ at a plurality of radar targets, which are only separable over the angles, is impaired, since they are located in the same distance-velocity cell.

The signal processing steps outlined in FIGS. 3 and 8 may be implemented by the associated control program of radar device 100, both in the form of software running on a computing device (e.g., microcontroller, DSP, etc.) and in the form of hardware (e.g., FPGA, ASIC, etc.).

Figure 9:
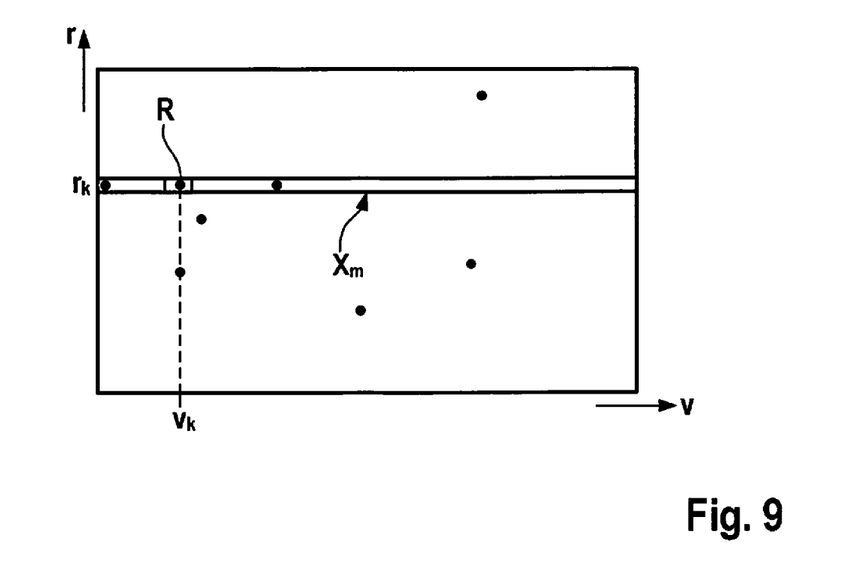
FIG. 9 shows a representation of windowing or selection of radar targets.

FIG. 9 shows a principle of selecting a radar target 200 in a distance-velocity spectrum including a plurality of reflection positions, represented as points, of a kth target reflection R, for which transverse velocity component $v_q$ is currently intended to be calculated. Only the values in vector $X_m$ at the estimated distance $r_k$ are used. Values in vector $X_m$, which lie outside the peak width around $v_k$, are suppressed via windowing, or by setting them to zero. As a result, due to this, only the target reflection R remains, for which the transverse velocity is currently intended to be ascertained. The elements of vector $X_m$ are the values of virtual angle spectra at spectral index m in velocity direction v, or, after inverse Fourier transformation, for $x_m = IFFT(X_m)$ at temporal ramp index m. The windowing takes place analogously in the one-dimensional or two-dimensional angle spectrum. The proposed method is executed sequentially for each target reflection R windowed in this manner. In step 360, vector $x = IFFT(X)$, which is used as an input value for subsequently estimating the transverse velocities in step 370, is generated by inverse Fourier transformation.

One advantageous use of the method of the present invention may be to implement a system, which warns of falling objects (e.g., objects thrown off of a bridge or falling rock in the mountains) and/or prevents a collision with the above-mentioned objects and/or minimizes at least the severity of an accident resulting from it.

One skilled in the art may also implement specific embodiments of the method and the device, which are not described in the following, without departing from the essence of the present invention.

What is claimed is:

1. A method for ascertaining a transverse velocity component of at least one radar target with a radar device, the method comprising:
    periodically sending identically modulated, transmitted signals with a transmitting device having a defined number of transmission elements, into a defined sensing region of the radar device during a defined measuring period;
    receiving at least one received radar signal reflected by the radar target, using a receiving device having a defined number of receiving elements;
    transmitting the received radar signal to an evaluation device and converting the received radar signal from analog to digital;
    carrying out a two-dimensional Fourier transformation to generate, in each instance, a velocity-distance spectrum of the digital, measured values for each combination of transmission and receiving element;
    detecting at least one target reflection of the radar target in light of defined, peak values in a magnitude spectrum of the velocity-distance spectrum;
    ascertaining a distance of the radar target from the radar device, as well as a radial velocity component relative to the radar device, from the velocity-distance spectrum;
    determining at least one angle of the radar target relative to the antenna;
    selecting the radar target, for which the transverse velocity component is intended to be ascertained;
    carrying out an inverse Fourier transformation of the target reflection of the radar target, selected in this manner; and
    ascertaining the transverse velocity component of the radar target from the transformed, measured values;
    wherein for the determination of the radar targets, the sensing region having the transverse velocities is selected so that a quality function is convex in the sensing region and the sensing region is not completely scanned, and wherein the quality function is of the transverse velocity components in azimuth and elevation.

2. The method as recited in claim 1, wherein the identically modulated, transmitted signals are ramp-shaped, frequency-modulated radar signals or non-linear ramp signals or periodic pulse signals or OFDM signals.

3. The method as recited in claim 1, wherein the transverse velocity component of the at least one radar target is ascertained in the azimuthal direction and/or in the direction of elevation.

4. The method as recited in claim 1, wherein the following mathematical model is used for modeling physical conditions:

$$r(t) = \sqrt{r_0^2 + (v_q \cdot t)^2};$$
$$\Delta r(t) = r(t) - r_0;$$

-continued $$t = -\frac{T_{meas}}{2} \ldots \frac{T_{meas}}{2}$$

$$v_e = -\frac{v_q^2 \cdot t}{r(t)};$$

$$a_e = -\frac{(r_0 \cdot v_q)^2}{r(t)^3};$$

$$\Delta\varphi(t) = 2\mathrm{atan}\left(\frac{v_q t}{2r_0}\right)$$

$$\Delta \bar{r} = \begin{cases} r_0 \cdot \left(\frac{\sqrt{1+b^2}}{2} + \frac{1}{2b} \cdot \ln\left(b + \sqrt{1+b^2}\right) - 1\right); & v_q \neq 0 \text{ m/s} \\ 0 & v_q = 0 \text{ m/s} \end{cases}$$

$$\bar{v}_e = 0 \frac{\mathrm{m}}{\mathrm{s}};$$

$$\bar{a}_e = \frac{-2v_q^2}{\sqrt{(2r_0)^2 + (v_q T_{meas})^2}};$$

$$b = \frac{v_q T_{meas}}{2r_0}$$

including the parameters:
r . . . distance between the transmitting and receiving antenna and the radar target
$r_0$ . . . minimum target distance at time t=0 s
t . . . time
$\Delta \bar{r}$ . . . average value of the change in distance over the measuring time
$v_q$ . . . transverse velocity
r(t) . . . target distance over the measuring time (from ramp to ramp)
$\varphi$ . . . azimuthal and/or elevation angle
$\Delta\varphi(t)$ . . . change in the azimuthal or elevation angle over the time
$v_e$ . . . radial velocity component resulting from the transverse velocity
$a_e$ . . . radial acceleration component resulting from the transverse velocity
$T_{meas}$ . . . measuring time
b . . . auxiliary parameter.

5. The method as recited in claim 1, wherein a selection and reconstruction of a target reflection signal is carried out over an angle spectrum, and the target reflection positions over the azimuthal and/or elevation angles are separated from each other.

6. The method as recited in claim 1, wherein the method is executed application-specifically for selected radar targets.

7. The method as recited in claim 1, wherein the method is used for a tracking-based method.

8. A method for ascertaining a transverse velocity component of at least one radar target with a radar device, the method comprising:
periodically sending identically modulated, transmitted signals with a transmitting device having a defined number of transmission elements, into a defined sensing region of the radar device during a defined measuring period;
receiving at least one received radar signal reflected by the radar target, using a receiving device having a defined number of receiving elements;
transmitting the received radar signal to an evaluation device and converting the received radar signal from analog to digital;
carrying out a two-dimensional Fourier transformation to generate, in each instance, a velocity-distance spectrum of the digital, measured values for each combination of transmission and receiving element;
detecting at least one target reflection of the radar target in light of defined, peak values in a magnitude spectrum of the velocity-distance spectrum;
ascertaining a distance of the radar target from the radar device, as well as a radial velocity component relative to the radar device, from the velocity-distance spectrum;
determining at least one angle of the radar target relative to the antenna;
selecting the radar target, for which the transverse velocity component is intended to be ascertained;
carrying out an inverse Fourier transformation of the target reflection of the radar target, selected in this manner; and
ascertaining the transverse velocity component of the radar target from the transformed, measured values;
wherein the following mathematical model is used for modeling physical conditions:

$$r(t) = \sqrt{r_o^2 + (v_q \cdot t)^{2i}} \; \Delta r(t) = r(t) - r_0; \; t = -\frac{T_{meas}}{2} \ldots \frac{T_{meas}}{2}$$

$$v_e = -\frac{v_q^2 \cdot t}{r(t)}; \; a_e = -\frac{(r_0 \cdot v_q)^2}{r(t)^2}; \; \Delta\varphi(t) = 2\mathrm{atan}\left(\frac{v_q t}{2r_0}\right)$$

$$\Delta \bar{r} = \begin{cases} r_0 \cdot \left(\frac{\sqrt{1+b^2}}{2} + \frac{1}{2b} \cdot \ln\left(b + \sqrt{1+b^2}\right) - 1\right)_i & v_q \neq 0 \; m/s \\ 0 & v_q = 0 \; m/s \end{cases}$$

$$\bar{v}_e = 0 \frac{m}{s}; \; \bar{a}_e = \frac{-2v_q^2}{\sqrt{(2r_0)^2 + (v_q T_{meas})^2}}; \; b = \frac{v_q T_{meas}}{2r_0}$$

including the parameters:
r . . . distance between the transmitting and receiving antenna and the radar target
$r_0$ . . . minimum target distance at time t=0 s
t . . . time
$\Delta \bar{r}$ . . . average value of the change in distance over the measuring time
$v_q$ . . . transverse velocity
r(t) . . . target distance over the measuring time (from ramp to ramp)
$\varphi$ . . . azimuthal and/or elevation angle
$\Delta\varphi(t)$ . . . change in the azimuthal or elevation angle over the time
$v_e$ . . . radial velocity component resulting from the transverse velocity
$a_e$ . . . radial acceleration component resulting from the transverse velocity
$T_{meas}$ . . . measuring time
b . . . auxiliary parameter; and
wherein an estimation of the transverse velocity component is ascertained by maximizing a quality function, using the following mathematical equations:

$$\{\hat{v}_{q,a}, \hat{v}_{q,e}\} = \underset{v_{q,a}, v_{q,e}}{\mathrm{argmax}} |Q(v_{q,a}, v_{q,e})|;$$

$$m = 0, \ldots, M - 1;$$

-continued $$T_{meas} = M \cdot T_{RR}$$

$$Q(v_{q,a}, v_{q,e}) = \sum_{m=0}^{M-1} |(x_m^T \cdot A_c) \cdot a_m(v_{q,a}, v_{q,e}) \cdot \exp(-j \cdot \omega_d \cdot T_{RR} \cdot m)|^2$$

$$a_m(v_{q,a}, v_{q,e}) = \exp[-j \cdot \Delta\beta_m(v_{q,a}, v_{q,e})];$$

$$\Delta\beta_m(v_{q,a}, v_{q,e}) = 2[r_m(v_{q,a}, v_{q,e}) - \bar{r}] \cdot k$$

including the parameters:
Q . . . quality function of the transverse velocity components in azimuth and elevation
$v_{qa}$ . . . transverse velocity component in azimuth
$v_{qe}$ . . . transverse velocity component in elevation
k . . . wave number
$a_m$ . . . vector having entries corresponding to a number of virtual receive channels (combination of transmitting and receive channel)
$A_e$ . . . calibration matrix
m . . . index of the time $t_m$
$r_m$ . . . vector of the target distances from all receive channels at time $t_m$
$\omega_d$ . . . estimated angular Doppler frequency
$\bar{r}$ . . . average target distance in the measuring interval
$T_{RR}$ . . . period of time between the ramp signals
$\Delta\beta_m$ . . . change in the phase angle of the measuring signal at time $t_m$
$x_m^T$ . . . transposed vector including the preprocessed, selected and inverse-Fourier-transformed, measuring signal at time $t_m$, which contains, as much as possible, only the signal portion of the reflection (peak) of a physical target, for which the transverse velocity is currently intended to be estimated.

9. A method for ascertaining a transverse velocity component of at least one radar target with a radar device, the method comprising:
periodically sending identically modulated, transmitted signals with a transmitting device having a defined number of transmission elements, into a defined sensing region of the radar device during a defined measuring period;
receiving at least one received radar signal reflected by the radar target, using a receiving device having a defined number of receiving elements;
transmitting the received radar signal to an evaluation device and converting the received radar signal from analog to digital;
carrying out a two-dimensional Fourier transformation to generate, in each instance, a velocity-distance spectrum of the digital, measured values for each combination of transmission and receiving element;
detecting at least one target reflection of the radar target in light of defined, peak values in a magnitude spectrum of the velocity-distance spectrum;
ascertaining a distance of the radar target from the radar device, as well as a radial velocity component relative to the radar device, from the velocity-distance spectrum;
determining at least one angle of the radar target relative to the antenna;
selecting the radar target, for which the transverse velocity component is intended to be ascertained;
carrying out an inverse Fourier transformation of the target reflection of the radar target, selected in this manner; and
ascertaining the transverse velocity component of the radar target from the transformed, measured values, wherein for the determination of the radar targets, the sensing region having the transverse velocities is selected so that a quality function is convex in the sensing region and the sensing region is not completely scanned, and wherein the quality function is of the transverse velocity components in azimuth and elevation, and
wherein the method is carried out for a system that warns of falling objects and/or consequently prevents a collision and/or minimizes at least the severity of an accident resulting from it.

10. A device for ascertaining a transverse velocity component of at least one radar target with a radar device, comprising:
a transmitting device, which has a defined number of transmission elements and is configured to periodically send identically modulated, transmitted radar signals into a defined sensing region of the radar device during a defined measuring period;
a receiving device, which has a defined number of receiving elements and is configured to receive at least one received radar signal reflected by the radar target; and
a processing device, which is configured to:
convert the received radar signals from analog to digital;
perform a two-dimensional Fourier transformation for generating a velocity-distance spectrum of the digital, measured values;
detect at least one target reflection of the radar target (200) in light of defined, peak values in a magnitude spectrum of the velocity-distance spectrum;
ascertain a distance of the radar target from the antenna, as well as a radial velocity component relative to the antenna, from the velocity-distance spectrum;
determine at least one angle of the radar target relative to the antenna;
suppress all of the target reflections and interference, with the exception of the radar target, for which the transverse velocity component is intended to be estimated; and
perform an inverse Fourier transformation in the Doppler direction for the target reflection of the radar target selected in this manner; the transverse velocity component of the radar target being ascertained from the transformed, measured values;
wherein for the determination of the radar targets, the sensing region having the transverse velocities is selected so that a quality function is convex in the sensing region and the sensing region is not completely scanned, and wherein the quality function is of the transverse velocity components in azimuth and elevation.

11. A device for ascertaining a transverse velocity component of at least one radar target with a radar device, comprising:
a transmitting device, which has a defined number of transmission elements and is configured to periodically send identically modulated, transmitted radar signals into a defined sensing region of the radar device during a defined measuring period;
a receiving device, which has a defined number of receiving elements and is configured to receive at least one received radar signal reflected by the radar target; and a processing device, which is configured to:
convert the received radar signals from analog to digital;
perform a two-dimensional Fourier transformation for generating a velocity-distance spectrum of the digital, measured values;
detect at least one target reflection of the radar target (200) in light of defined, peak values in a magnitude spectrum of the velocity-distance spectrum;
ascertain a distance of the radar target from the antenna, as well as a radial velocity component relative to the antenna, from the velocity-distance spectrum;
determine at least one angle of the radar target relative to the antenna;
suppress all of the target reflections and interference, with the exception of the radar target, for which the transverse velocity component is intended to be estimated; and
perform an inverse Fourier transformation in the Doppler direction for the target reflection of the radar target selected in this manner; the transverse velocity component of the radar target being ascertained from the transformed, measured values, wherein for the determination of the radar targets, the sensing region having the transverse velocities is selected so that a quality function is convex in the sensing region and the sensing region is not completely scanned, and wherein the quality function is of the transverse velocity components in azimuth and elevation, and
wherein the device is configured to warn of falling objects and/or to prevent a collision with the falling objects and/or to minimize at least the severity of an accident resulting from it.

12. A non-transitory computer readable medium having a computer program, which is executable by a processor, comprising:
a program code arrangement having program code for ascertaining a transverse velocity component of at least one radar target with a radar device, by performing the following:
periodically sending identically modulated, transmitted signals with a transmitting device having a defined number of transmission elements, into a defined sensing region of the radar device during a defined measuring period;
receiving at least one received radar signal reflected by the radar target, using a receiving device having a defined number of receiving elements;
transmitting the received radar signal to an evaluation device and converting the received radar signal from analog to digital;
carrying out a two-dimensional Fourier transformation to generate, in each instance, a velocity-distance spectrum of the digital, measured values for each combination of transmission and receiving element;
detecting at least one target reflection of the radar target in light of defined, peak values in a magnitude spectrum of the velocity-distance spectrum;
ascertaining a distance of the radar target from the radar device, as well as a radial velocity component relative to the radar device, from the velocity-distance spectrum;
determining at least one angle of the radar target relative to the antenna;
selecting the radar target, for which the transverse velocity component is intended to be ascertained;
carrying out an inverse Fourier transformation of the target reflection of the radar target, selected in this manner; and
ascertaining the transverse velocity component of the radar target from the transformed, measured values;
wherein for the determination of the radar targets, the sensing region having the transverse velocities is selected so that a quality function is convex in the sensing region and the sensing region is not completely scanned, and wherein the quality function is of the transverse velocity components in azimuth and elevation.

* * * * *